Oct. 11, 1960
J. G. DAHLIN
2,955,569
PREPARED SPAWNING GROUND
Filed Sept. 28, 1956
2 Sheets-Sheet 1
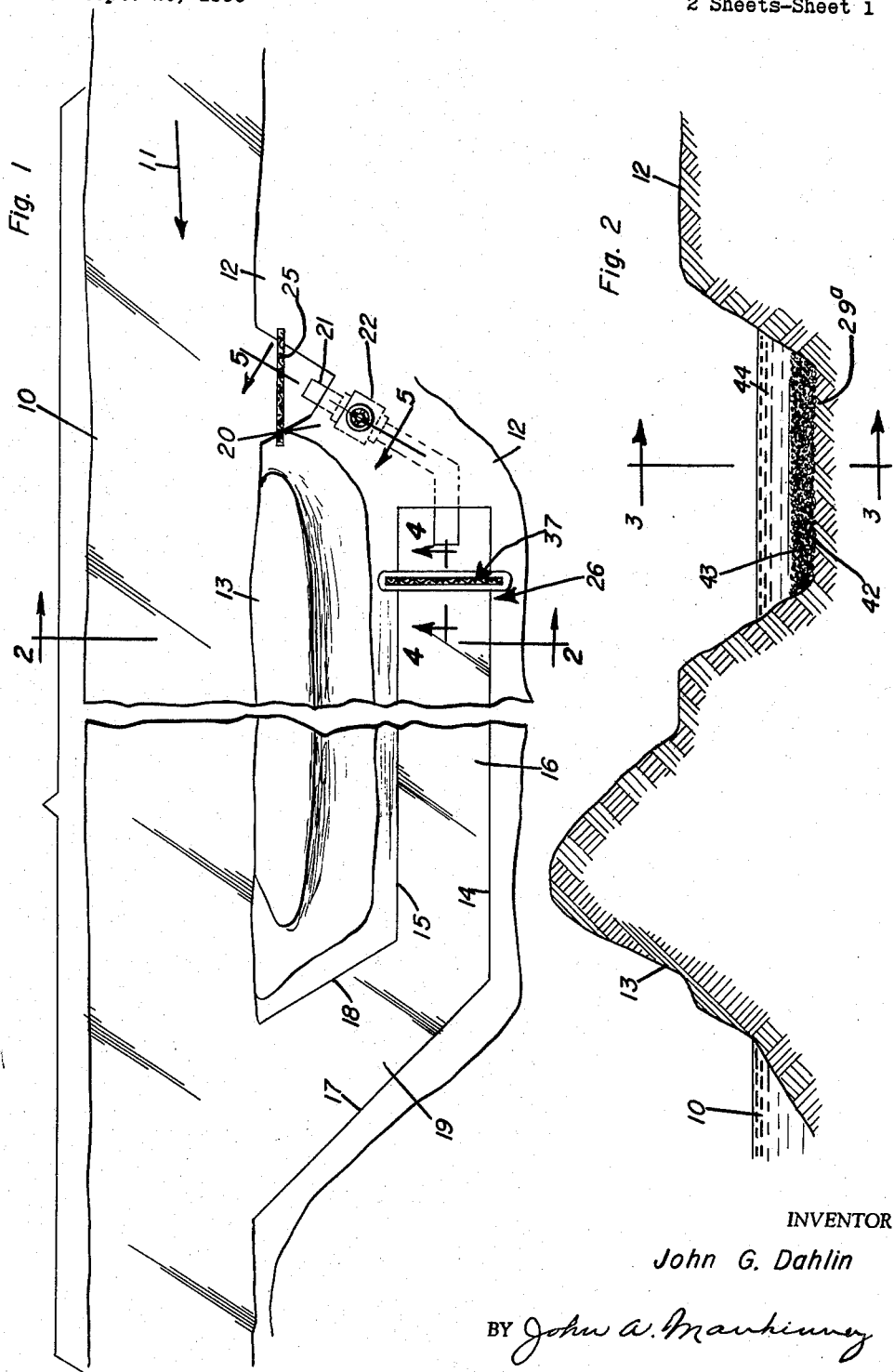
INVENTOR
John G. Dahlin
BY *John A. Mackinney*
ATTORNEY

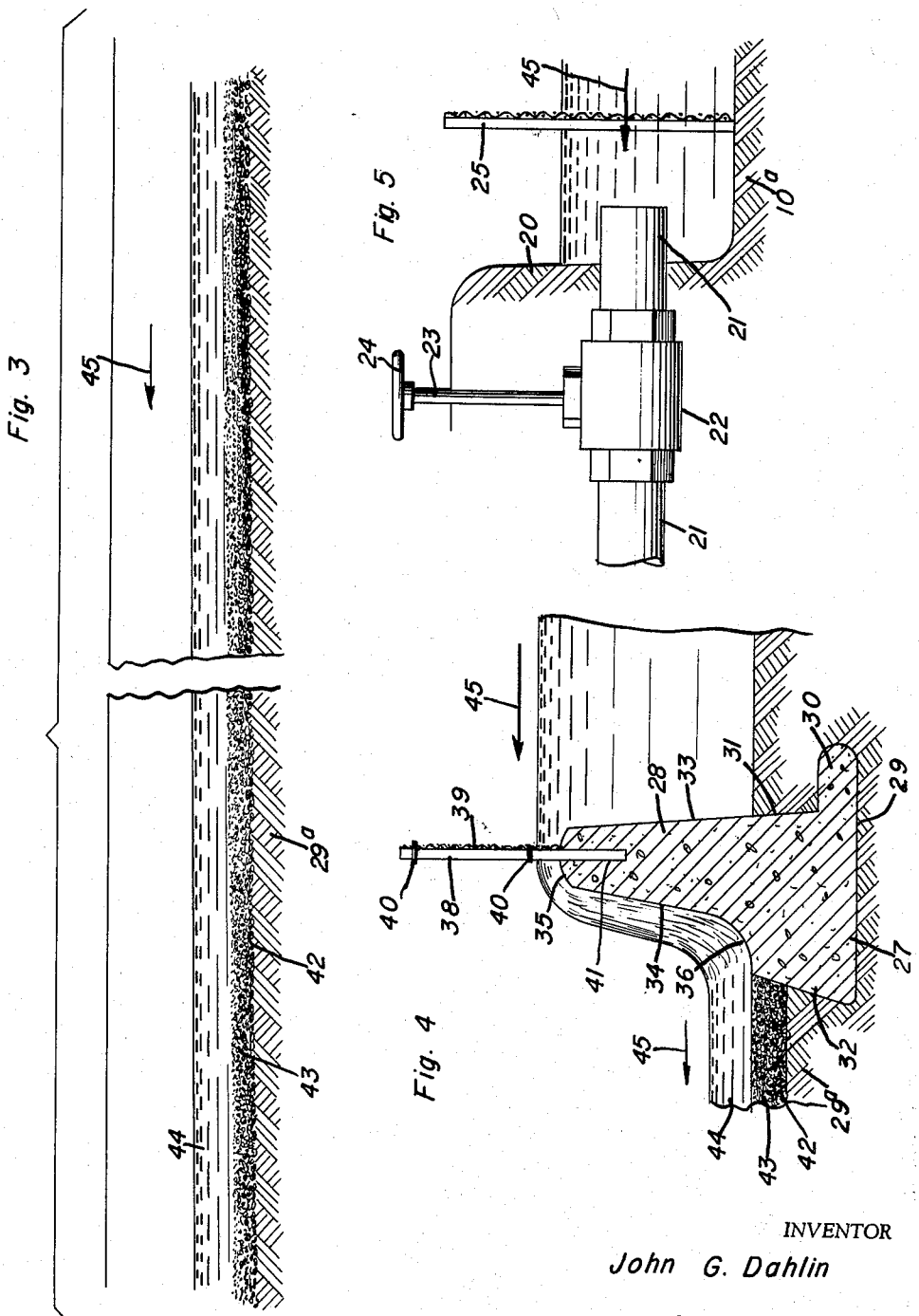

2,955,569
PREPARED SPAWNING GROUND

John G. Dahlin, 541 Kipp Ave., Chilliwack,
British Columbia, Canada

Filed Sept. 28, 1956, Ser. No. 612,792

2 Claims. (Cl. 119—3)

The present invention relates to a prepared spawning ground and method of artificially hatching fish, especially salmon, and has for an object the provision of a device of this kind in which the yield of young fish from the spawning operation is greatly increased by a high percentage of hatch so that the hatching of the eggs is almost one hundred percent.

Another object of the present invention is to provide a prepared spawning ground or hatchery which is of simple and low cost construction, maintenance and operation and will fit into and become a part of the natural terrain into which it is introduced.

Tests have shown that millions of fish per acre is the estimated yield by natural spawning in this hatchery whereas it is known that the percentage of hatch in natural spawning areas is normally very low, with the use of the present prepared spawning ground and artificial planting the yield is increased many millions of fish fry per acre. The very low percentage of natural hatch, that is, in a natural hatchery, is due mainly to the following two conditions:

(1) The absence of suitable bottom material in natural spawning areas. The bottom consists of rocks, boulders, mud, sand and silt and where gravel bottom exists a large proportion of it is sand and large stones.

(2) Great fluctuations in water levels. Low water kills the eggs while high water buries and smothers the eggs or washes them away.

The existence of these two conditions have an adverse effect on the salmon industry as they cause the hatch yield to vary greatly and unpredictably from year to year.

It is an object of the present invention to eliminate these two adverse conditions by providing a prepared spawning ground in which there is provided a controlled water supply as to depth, volume and velocity and a bottom comprising small pebbles, crushed rock or the like. With this arrangement the main objection to the building of dams in salmon streams is overcome as hatcheries constructed in accordance with the present invention can be built and successfully operated below the dam.

The present invention aims to provide a device of this character which admits of easy and effective cleaning thereof.

The present invention also aims to provide a method of artificial hatching or spawning fish eggs consisting of the steps of preparing a bottom of small pebbles, manually planting the fish eggs upon the bottom, causing a supply of water to flow over the bottom and the eggs, and controlling the depth, volume and velocity of the water flowing over the bottom and the eggs.

With the foregoing and other objects in view, the invention will be hereinafter more fully described and more particularly pointed out in the appended claims.

In the drawings in which the same parts are denoted by the same reference numerals throughout the several views, Figure 1 is a top plan view of a prepared spawning ground constructed in accordance with the present invention and installed adjacent to a salmon stream, Figure 2 is a sectional view on the line 2—2 of Figure 1, Figure 3 is a sectional view on the line 3—3 of Figure 2, Figure 4 is an enlarged sectional view on the line 4—4 of Figure 1, and Figure 5 is an enlarged sectional view on the line 5—5 of Figure 1.

Referring more particularly to the drawings, 10 indicates a main stream containing salmon, the direction of flow of which is indicated by the arrow 11. The stream 10 is bounded on one side by a natural or artificial bank of earth 12 and a dike 13 of earth, concrete or other suitable material is constructed in the stream 10 in spaced relation and substantially parallel to the bank 12.

The adjacent faces 14 and 15 of the bank and dike respectively define or bound the spawning ground or hatchery, generally indicated at 16, and the distance between the faces 14 and 15 determines the width of the spawning ground. The length of the spawning ground can be determined by digging away the downstream end of the bank 12 the desired distance and extending the downstream end of the dike a corresponding distance.

The space defined by the inclined walls 17 and 18 of the bank 12 and the dike 13 comprises a pre-spawning pool 19 several feet in depth and located at the downstream end of the hatchery 16. The upstream end of the dike 13 is continued across the upstream end of the hatchery and is joined to the bank 12 so as to isolate the upstream end of the hatchery from the stream 10.

In order to furnish a controlled supply of water to the hatchery from the stream 10, a conduit 21 which may be in the form of a pipe extends through the upstream end portion 20 of the dike and has its upstream or inlet end opening into the stream 10 below the surface thereof. The downstream or outlet end of the conduit 21 opens into the upstream end of the hatchery. A conventional type gate valve 22 is positioned in the conduit 21 and the operating stem 23 of the valve extends upwardly above the dike portion 20 and carries an operating wheel or handle 24.

A track rack or screen 25 of a conventional type is positioned upstream of the inlet end of the conduit 21 and is held in proper position by having its opposite side portions embedded in the adjacent walls of the dike 13 and the bank 12. The bottom edge of the screen engages the floor or bed 10a of the stream 10 and the upper end portion of the screen extends above the water level of the stream so that trash, debris and the salmon or other fish are prevented from entering the inlet end of the conduit 21. The rack 25 may be formed by stretching a section of wire screening of the desired mesh between two standards and securing the opposite side portions of the screening to the standards by welding or the like.

At the head of the spawning ground 16 and downstream of the outlet end of the conduit 21, an overflow weir, generally indicated at 26, is disposed transversely of the spawning ground. Their weir may be made of concrete or other suitable material and comprises a base 27 from which arises the main body portion 28. The base 27 is embedded in the floor 29 of the head of the spawning ground and has a projection 30 which extends upstream and interlocks with the floor 29.

The upstream face 31 of the base above the projection 30 is inclined upwardly and in a downstream direction and the downstream face 32 of the base is inclined upwardly and in an upstream direction to provide a wedge shaped base which cooperates with the projection 30 to firmly anchor the base in the floor 29.

The upstream face 33 and the downstream face 34 of the body portion 28 of the weir are inclined in the same manner and to substantially the same degree as the corresponding faces 31 and 32 of the base so that the body portion tapers upwardly and its top wall 35 is curved in cross section. The lower portion of the face 34 is curved downwardly in a downstream direction to form a concave surface 36 which forms an apron. As can be seen from Figure 1 of the drawing, the weir extends across the entire width of the head of the spawning ground and is embedded in the bank 12 and the dike 13.

In order to prevent the fish from jumping over the weir, a screen, generally indicated at 37, is mounted upon the top of the weir. The screen comprises a pair of standards 38 which may be in the form of rods or tubes between which is stretched a fabric netting 39 which may be made of the same material as a fish net. The opposite end portions of the netting are secured to the standards 38 by suitable fastenings 40 which may be in the form of wire loops engaging in the netting and encircling the standards. The lower end portions of the standards are received by sockets 41 formed in the body portion 28 of the weir and which open through the top wall thereof. When the screen is not needed the standards could be removed from the sockets and the netting rolled up on the standards for storage.

The spawning ground 16 is made by grading the portion 29a of the floor 29 so that its upper surface is smooth and slopes slightly downwardly from the upstream end of the hatchery towards the downstream end thereof to form the bottom 42 of the spawning bed. The grade or degree of slope is such as to induce the desired rate of flow of the water through the spawning bed. A layer or bed 43 of specially prepared small pebbles or crushed and screened rock is laid upon the bottom 42 to a depth of about six inches in such a manner that the upper surface of the layer 43 has the same slope as the bottom 42.

The pebbles or rocks comprising the layer 43 should preferably be about one-fourth to three-fourths of an inch in diameter and may be obtained by screening selected gravel twice to remove sandy material and coarse material.

In the use of the device, the spawning bed or hatchery should preferably be built adjacent to and parallel with a natural stream, such as, the stream 10 in order to provide a water supply and water outlet for the hatchery. The hatchery may be operated by either the natural spawning method or the manual planting of the eggs. It is preferred that the initial operation, at least of a new hatchery should be by the manual planting of the eggs since, as is well known, the fish hatched in a spawning ground will themselves return to that spawning ground to spawn. When the manual planting method is employed, the spawn or eggs are easily obtained by the well known conventional procedure.

The flow of water to the spawning ground 16 will be stopped by closing the valve 22. The eggs will be deposited on the layer 43 by placing them in furrows similar to planting seeds in a garden. The valve 22 will then be opened sufficiently to maintain the water 44 in the hatchery at the desired level. The direction of flow of the water to and through the hatchery is indicated by the arrows 45. The dike 13 extends considerably above the water level of the stream 10 and keeps flood waters from the stream from entering the hatchery.

The weir 26 in cooperation with the valve 22 provides a uniform volume and velocity of flow of water to the hatchery over its entire width and prevents damage to the hatchery bed. Flood waters may back up from the stream 10 and enter the downstream end of the hatchery through the pre-spawning pool 19. However, this backup water will do little or no harm as it is quiet water.

When the eggs have hatched, the small fish or fry will depart at will and when they have matured and return to spawn they will remain in the pre-spawning pool 19 until ready to spawn. If the natural spawning method is used, these fish will not be molested but will be permitted to spawn when ready. However, if the manual planting method is used when the fish are ripe they will be killed (they die soon anyway) and the spawn or eggs taken from them and manually planted as described above. It has been found by experiment that when the eggs are artificially planted, the capacity of the hatchery is greatly increased.

Cleaning of the spawning ground is essential about once a year as otherwise it would be ruined by the accumulation of mud and silt and other debris. The present spawning ground admits of simple and low cost cleaning methods. For example, a farm implement, such as a cultivator or harrow, may be run over the bed of pebbles or rocks 43. The flow of water through the hatchery will carry the mud, silt and debris away. In a hatchery of small area the use of a pump and fire hose has proved to be highly satisfactory for cleaning the bed.

By way of example only, the hatchery could be 1000 feet long and 12 feet wide, the depth of the water 6 to 12 inches and the gradient or degree of slope of the bottom 42 and pebbles 43 could be such as to produce a rate of flow of the water of from 2 to 6 miles per hour.

It is apparent from the above description that the hatchery of the present invention possesses the following advantages over natural spawning beds:

(1) It has controlled water supply as to depth, volume and velocity, (2) It has ideal bottom material for spawning, (3) It admits of the use of simple and inexpensive means for efficient cleaning of the spawning bed.

(4) The yield of fish is controllable, reliable and predictable with choice as to variety—sockeye, king or cohoe instead of chums.

(5) This hatchery will save for the fisherman vast numbers of fish which normally spawn and die.

(6) Under present conditions salmon waters produce far short of capacity because adequate spawning runs would leave too few for the commercial catch. This hatchery will correct this condition, and (7) It can be located at chosen and suitable spots, such as, below dam sites and near ocean. Location near the ocean will save great numbers of fish fry normally lost to predators in hundreds of miles of streams.

It is obvious that various changes and modifications may be made in the details of construction and design of the above specifically described embodiment of this invention without departing from the spirit thereof, such changes and modifications being restricted only by the scope of the following claims.

What I claim is:

1. For use with a natural stream, a prepared spawning ground and hatchery comprising an artificial stream laterally offset from and parallel to a natural stream and having an inlet upstream and an outlet downstream communicating with the natural stream, said spawning ground and hatchery having a bottom of substantially impervious material the upper surface of which is inclined downwardly in the downstream direction from said inlet towards said outlet, a bed of pebbles deposited in said bottom and having its upper surface substantially parallel to the upper surface of the natural bottom material, and variable volume water conducting means between the natural stream and said inlet providing a controlled flow of said water over said bed of pebbles only in a downstream direction substantially parallel to the upper surface of the bed.

2. For use with a natural stream, a prepared artificial spawning ground and hatchery comprising an artificial stream laterally offset from and parallel to the natural stream and having an inlet upstream at one elevation and an outlet downstream at a lower elevation than the inlet and in communication with the natural stream, said spawning ground and hatchery having a bottom of substantially impervious material the upper surface of which is inclined downwardly in the downstream direction from the said inlet towards said outlet, a bed of pebbles deposited in said bottom and having its upper surface substantially parallel to the upper surface of the bottom material, variable water controlling means adjacent the inlet conducting water from the natural stream to said inlet and causing a flow of said water only over said bed of pebbles in a downstream direction substantially parallel to the upper surface of the bed, said water conducting means including height, volume and rate of flow water control means, and means comprising a weir positioned between the water control means and the outlet for effecting a substantially large elevation of the water, said inclined bottom and bed of pebbles constituting a gently downstream sloping elevation differential between the weir outlet and the stream outlet.

References Cited in the file of this patent

UNITED STATES PATENTS

| | | |
|---|---|---|
| 78,952 | Furman | June 16, 1868 |
| 160,002 | Bond | Feb. 23, 1875 |
| 518,318 | Hoxsie | Apr. 17, 1894 |
| 518,319 | Hoxsie | Apr. 17, 1894 |
| 1,528,179 | Baldridge | Mar. 3, 1925 |

OTHER REFERENCES

Pages 26–32 of Bureau of Fisheries Document No. 1,056 of 1929, entitled Propagation of Pondfishes.